United States Patent Office 3,682,865
Patented Aug. 8, 1972

3,682,865
POLYMERISATION PROCESS
Victor F. Jenkins, St. Albans, and Geoffrey P. Newton and Michael J. Beeken, Luton, England, assignors to Laporte Industries Limited, London, England
No Drawing. Filed May 19, 1969, Ser. No. 825,930
Claims priority, application Great Britain, May 22, 1968, 24,519/68
Int. Cl. C08g *17/097, 17/017*
U.S. Cl. 260—75 EP                14 Claims

ABSTRACT OF THE DISCLOSURE

Novel polyesters characterised by the presence of, as the main chain-extending groups, groups of the type —[—CO—A—CO—O—E—O—]$_x$
—[—CO—X—O—]$_y$ where $x$ and $y$ are small integers (e.g. 1 to 4). The novel polyesters are produced by the reaction together in a controlled manner of a lactone and a polycarboxylic anhydride and an epoxide (oxirane or oxetane) of formulae

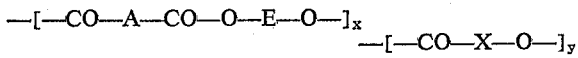

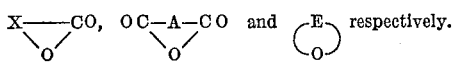 respectively.

An active hydrogen atom compound is generally used as initiator. Etherification inhibitors and/or lactone polymerisation catalysts may be employed. The reaction is controlled so that the rate of consumption of each of the reactants is substantially identical.

BACKGROUND OF THE INVENTION

Polyesters derived from lactones (or aliphatic monohydroxymonocarboxylic acids) have certain valuable properties, for example improved hydrolysis resistance and low temperature properties, when compared with polyesters of the type derived from the reaction of compounds having two hydroxy groups and compounds having two carboxylic groups. The latter type of polyester has, however, hitherto been cheaper and more adaptable to particular uses by varying a proportion of its constituents.

It is an object of the present invention to obtain polyesters that are produced from cheaper raw materials than polyesters derived from lactones.

It is a further object of the present invention to obtain a polyester having good hydrolysis resistance.

It is a further object of the present invention to obtain a polyester that can form a polyurethane having a low degree of crystallinity.

It is a further object of the present invention to obtain a polyester that can form a polyurethane having good elastomeric properties.

It is a further object of the present invention to obtain a polyester suitable for use in plasticising polyvinyl chloride.

These and such further objects of the invention as will be obvious to those skilled in the art are achieved by the invention described in the following description of our invention.

DESCRIPTION OF THE INVENTION

The present invention provides for a process for the production of a substantially linear polyester composition comprising reacting together an epoxide, as hereinafter defined, a polycarboxylic acid anhydride, and a lactone, as hereinafter defined, wherein the reaction is conducted in such a manner that a polyester is formed, having as at least 80% of its chain-extending groups, groups of the type —[—CO—A—CO—O—E—O—]$_x$
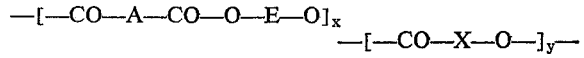

in which formula A, E, X, $x$ and $y$ have the meanings assigned to them hereinafter. Such polyesters are hereafter referred to as "non-random polyesters."

In general, particularly if polyesters of low molecular weight are required, the process is preferably carried out in the presence of a compound containing at least one active hydrogen atom attached to an oxygen, sulphur or nitrogen atom as initiator. We have found that the process will result in the formation of a polyester in the absence of the specific addition of an initiator. We do not know whether any traces of impurities, that for example water, act as initiators or react with other compounds to form compounds that act as initiators, or whether the polymerisation is not initiated by such an initiator having an active hydrogen atom.

By "epoxide" we mean compounds having an oxirane or an oxetane ring or mixtures of such compounds. Suitable classes of compounds include oxiranes and oxetanes substituted with alkyl or aryl groups, including substituted alkyl or aryl groups, in particular chlorosubstituted or alkoxy or aryloxy substituted alkyl or aryl groups.

A modification of the invention provides for at least a portion of the epoxide to be replaced by an aziridine for example aziridine. The polymers produced by the modified process are polyesteramides, otherwise analogous to the polyesters derived from epoxides.

In the graphic formulae in this specification and claims we use —E— to denote the group derived from such an epoxide or aziridine denoted by the formulae

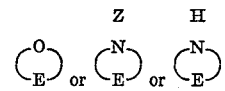

wherein Z is any aryl or alkyl group. Thus when the epoxide is 1,2-epoxybutane or 1,3-epoxybutane the group

—O—E—O—

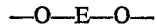

would be

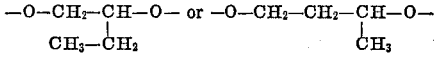

respectively.

In the modification of the invention wherein at least a portion of the epoxide is replaced by an aziridine one linkage of the group —E— derived from the aziridine is an amide group. When any of the graphic formulae in this specification and claims are applied to this modification of the invention, the linkages of the group —E— with other groups by means of oxygen atoms, thus: —O—E—O, are to be understood as including —NH— or —NZ— linkages derived from the aziridine, thus:

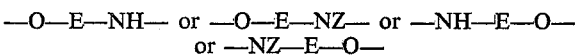

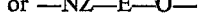

Oxiranes and oxetanes substituted with alkyl or aryl groups which groups are substituted by ester groupings, being alkoxy- or aryloxy-carbonyl or alkyl- or aryl-carbonyloxy groups, are also suitable. Oxiranes and oxetanes substituted with groups further substituted with active hydrogen atoms attached to nitrogen, sulphur or oxygen atoms may be used. The products obtained from them will, however, be branched, the active hydrogen atom reacting with the lactone as a polymerisation initiator.

Suitable epoxides include 1,2-epoxyethane, 1,2-epoxypropane, 1,2-epoxybutane, 1,2-epoxyoctane, 1,2-epoxydecane, 1,2-epoxydodecane, 1,2-epoxyeicosane, 3,4-epoxyoctane, glycidyl ethers for example allyl glycidyl ether, octyl glycidyl ether, butyl glycidyl ether, isooctyl glycidyl ether, phenyl glycidyl ether, cresyl glycidyl ether, glycidyl esters, for example glycidyl methacrylate and glycidyl esters of fatty acids for example glycidyl laurate, glycidyl decanoate and glycidyl palmitate, glycidol, dipentene monoxide, pinene monoxide, limonene monoxide, epoxidised fatty esters, for example octyl epoxysterate, styrene oxide, cyclohexane epoxide, epichlorhydrin, oxetane and 2,3-di-(chloromethyl)oxetane.

Diepoxides may be used if desired, in admixture with a monoepoxide. However, if too large a proportion of diepoxide is used the polyester produced will not be linear but will be crosslinked. Suitable diepoxides include diglycidyl ether and diglycidyl ethers of diols, for example ethylene glycol, diglycidyl ether, and resorcinol diglycidyl ether, 1:2,3:4-diepoxy butane and limonene diepoxide.

B1 "lactone" we mean a compound of the formula

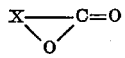

wherein X is a —(CH$_2$)$_n$— group wherein $n$ is an integer from 4 to 7 or wherein X is a —(CR$_2$)$_n$— group wherein $n$ is an integer from 4 to 7 and wherein each of the 8 to 14 groups R is any group selected from methyl, ethyl, n-propyl and isopropyl groups and hydrogen, chlorine and bromine atoms, provided that the total number of carbon atoms in the —(CR$_2$)$_n$— group does not exceed 12 and provided that there are no more than 2 halogen atoms in the —(CR$_2$)$_n$— group. Desirably $n$ is 5, i.e. the lactone is an epsilon-caprolactone, and preferably the lactone is epsilon-caprolactone, or a methyl-epsilon-caprolactone, or a mixture of isomeric methyl-epsilon-caprolactones, or a mixture of isomeric methyl-epsilon-caprolactone with epsilon-caprolactone.

Other specific lactones that we prefer to use, although the preference is less than those mentioned above are delta-valerolactones, and zeta-enanthalactones alone or as mixtures with each other or with one or more of the epsilon-caprolactones.

Any polycarboxylic acid anhydride may, in principle, be used in the process of this invention.

In the graphic formulae in this specification and claims we use —A— to denote the group derived from an anhydride denoted by the formula

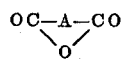

Thus if the anhydride is phthalic anhydride the group —O—CO—A—CO—O— would be

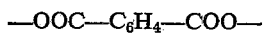

and if the anhydride were adipic anhydride the group —O—CO—A—CO—O— would be

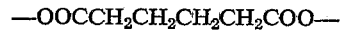

We prefer to use dicarboxylic acid anhydrides in the process of this invention. Anhydrides derived from saturated alkyl α,ω-dicarboxylic acids may be used. Those derived from unsaturated dicarboxylic acids are also suitable. Anhydrides derived from aromatic polycarboxylic acids are suitable. Examples of anhydrides that may be used include phthalic anhydride, maleic anhydride, succinic anhydride, adipic anhydride, substituted phthalic anhydride for example tetrachlorphthalic anhydride, glutonic anhydride, itaconic anhydride, hexahydrophthalic anhydride, chlorendic anhydride, citraconic anhydride, tetrahydrophthalic anhydride, dodecenyl succinic anhydride and substituted succinic anhydrides.

Anhydrides of tetra- or hexa- carboxylic acids may be used, if desired, in admixture with an anhydride of a dicarboxylic acid. However, if too large a proportion of tetra- or hexa- carboxylic acid anhydride is used the polyester produced will not be linear but will be crosslinked. Suitable anhydrides of such carboxylic acids include pyromellitic anhydride and trimellitic anhydride.

Anhdrides substituted with groups having active hydrogen atoms attached to nitrogen, sulphur or oxygen atoms may be used. The products therefrom will, however, be branched, the active hydrogen atoms reacting with the lactone as a polymerisation initiator.

Any compound having an active hydrogen atom attached to a nitrogen or oxygen atom may, in principle, be used as initiator. Particularly suitable are alcohols, mono- and di- substituted amines, phenols and carboxylic acids. Other classes of compounds may be used, but we believe that the rate of polymerisation using them may be low. Examples of preferred initiators include ethylene glycol, diethylene glycol, propylene glycol, dipropylene glycol, butane-1,4-diol, hexane-1,6-diol, trimethylol propane, pentaerythritol, glycerol, methanol, ethanol, propanol, butanol, iso-octanol, allyl alcohol, ethylene diamine, hexamethylene diamine, ethanolamine, diethanolamine, triethanolamine, aniline, diamino-diphenyl-methane, phenylene diamines, diethylene triamine, triethylene tetramine, urea, guanidine, carbazide, 2,2,4-trimethylhexan-1,6-diol, 2,2-dimethylpropan-1,3-diol, melamine, adipic acid, phthalic acid, succinic acid, maleic acid, fumaric acid, itaconic acid, azeleic acid, stearic acid, lauric acid, oleic acid, dimerised fatty acids, citric acid, malic acid, tartaric acid, acrylic acid and methacrylic acid, dodecyl mercaptan, and ethyl mercaptan.

Inorganic compounds may be used as initiators but with certain compounds the instability of the product may make unsuitable. Examples include water, ammonia, hydrazine, boric acid, phosphoric acid, hydroxylamine and hydrogen sulphide.

If an initiator having more than two active hydrogen atoms attached to oxygen, sulphur or nitrogen atoms is employed the polyester thus formed will have a branch or branches according to the number of the active hydrogen atoms. Each of the chains formed by each active hydrogen atom attached to an oxygen, sulphur or nitrogen atom will, however, except in such circumstances as are hereafter discussed, be linear.

Polymeric compounds may also be suitable as initiators for example polyvinyl alcohol and partially hydrolysed polyvinyl acetate and copolymers having as a comonomer an unsaturated compound, itself suitable for use as in initiator, shellac, cellulose, amine terminated polyamides, urea-melamine resins, phenolformaldehyde resins, rozin, styrene-maleic acid copolymers and phenolic resins.

The quantity of the initiator used governs the molecular weight of the polyester produced. If the proportion of initiator molecules that are reacted with the lactone, epoxide and anhydride is high, the molecular weight of the polyester will be low. If the proportion of initiator molecules is low, the molecular weight of the polyester will be high. The number of active hydrogen atoms on each molecule of initiator does not affect the molecular weight of the polyester produced; it affects the length of the chain of the polyester produced.

The non-random polyesters can be manufactured having, in principle, any desired molecular weight. The exact molecular weights it is possible to manufacture will depend on the molecular weights of the anhydride, epoxide, lactone and initiator if employed. Convenient molecular weights are above 500 and below 10,000. For many purposes a non-random polyester having a molecular weight between 900 and 5000 will be suitable. We have found that, particularly in the manufacture of polyurethanes from non-random polyesters terminated by two hydroxyl groups, molecular weights of between 1000 and 2500 are particularly advantageous.

The temperature at which the process of the present invention may conveniently be carried out will depend on the reactants and any solvents. A major factor, however, is the catalyst and the inhibitor, if they are used. The temperature chosen will depend on this factor. Suitable experiments will enable a choice to be made. As a guide, the reaction may usually be conducted between 100° C. and 200° C., although these are not extreme limits.

The reaction is preferably carried out in the presence of an etherification inhibitor. Suitable inhibitors include trisubstituted amines, organophosphines and salts of carboxylic acids, and alkali and alkaline earth metal carbonates, hydroxides and oxides. These inhibitors are believed to retard etherification reactions while promoting esterification reactions between epoxides and anhydrides.

Examples of these inhibitors include: trimethylamine, triethylamine, benzyldimethylamine, N-ethylpiperidine, pyridine, N-ethylmorpholine, tris-dimethylamino-phenol, 1,4-dizo-(2,2,2)-bicyclooctane (commonly known as triethylene diamine), tricyclohexyl phosphine, sodium trichloracetate, stannous octanoate, sodium carbonate, potassium carbonate, calcium carbonate, barium carbonate, barium hydroxide, calcium oxide, manganese stearate and zinc acetate.

The reaction is preferably carried out in the presence of a lactone polymerization catalyst. Most suitable types of catalysts are basic, including organometallic compounds, metal salts of carboxylic acids, and organophosphorus compounds.

Examples of these catalysts include titanates, for example tetrabutyl titanate and tetraoctyl titanate, organo-tin compounds, for example, dibutyl tin oxide and diphenyl tin oxide, salts of tin, lead and manganese for example stannous acetate, stannous octanoate, lead acetate, lead octanoate, manganese acetate and manganese octanoate, tricyclohexyl phosphine, and sodium acetate.

We believe that there are a number of possible reactions that may occur in the reaction mixture in the process of the invention. If an anhydride

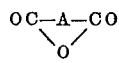

an epoxide

and a lactone

are reacted together in the presence of, for example, an alcoholic initiator MOH, the following reactions may occur with the initiator (I) 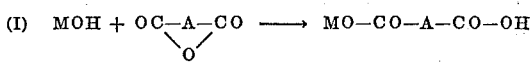

(II) MOH + X—CO → MO—CO—X—OH (III) 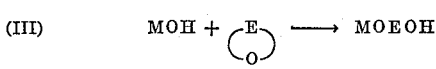

If the initiator is a carboxylic acid LCOOH the following reactions may occur with the initiator:

(IV) 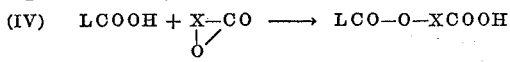

(V) 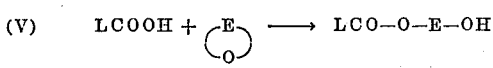

The products of reactions I and IV behave as carboxylic acids similar to LCOOH, for further reactions. The products of reactions II, III and V behave as alcohols, similar to MOH, for further reactions.

The process of the present invention is carried out in such a manner that reactions III and IV are not significant in comparison with reactions I, II and V. This results in the production of a nonrandom polyester, characterised by the presence of —CO—X—O— groups and

groups as substantially the only chain extending groups.

These polymers are substantially free from

—O—X—CO—O—E—O—CO—X—O— and —CO—X—O—CO—A—CO—O—X—CO— linkages, apart from any such linkages introduced because of the nature of the initiator, for example if the initiator is a 1,2 or a 1,3 glycol. Usually less than 10% of the lactone will be involved in such linkages, and advantageously less than 5% is so involved. Preferably less than 1% is so involved and most preferably less than 0.5%.

We have found that the rate of reaction of lactones with carboxylic acids is, relative to the rate of reaction with alcohols, slow. This may be confirmed by a study of the relative rates of initiated homopolymerisation of lactones. The presence of the lactone polymerisation catalyst assists the selectivity of the reactions of the lactone. Furthermore, if an epoxide is present, the epoxide also competes for reaction with the carboxylic acid group and reaction IV of the scheme above is not significant.

The presence of the etherfication inhibitor, we believe, affects the reactions in two ways. It inhibits the etherification reaction III of the scheme above, while catalysing etherification reactions, in particular reactions I and V. Certain of the lactone polymerisation catalysts, have also the effect of catalysing the esterification reactions I and V.

In theory, the non-random polyesters can be manufactured by a process, using suitable catalysts or combination thereof and suitable methods of mixing the reactants, that do not require the presence of an etherification inhibitor. We do not know of any combination of catalysts and methods of mixing the reactants which are available at the present time that would give the result desired, namely an insignificant amount of the etherification reaction III, in the absence of the etherification inhibitor.

The mere admixture of the reactants required to form a non-random polyester and the heating of the admixture to any temperature at which polymerisation takes place will not normally yield a non-random polyester.

Thus we have found that if an admixture of the reagents is heated to a temperature at which moderately rapid polymerisation occurs, the anhydride and the epoxide are consumed more rapidly than the lactone. The polyester thus produced is almost a block polymer, having chains of lactone residues at the chain-extending end of the polyester chain, and a preponderance of epoxide-anhydride-ester residues at the chain-initiating end of the polyester chain.

The polyesters of the present invention can be produced by diminishing the rate of reaction of the anhydride and the epoxide with the chain-extending groups to substantially that of the lactone with the chain extending groups. In theory, this could be done by the choice of suitable catalysts, but we do not know of any combination of catalysts which are available at the present time that would give this result. A practical process for the manufacture of the polyesters of the present invention is by the addition of one or more of the anhydride, the lactone and the epoxide to the initiator, or to a mixture of the initiator and any of the anhydride, the lactone and the epoxide not so added, or to the reaction product obtained by such addition at a suitable rate. If an etherification inhibitor or a catalyst or both is or are used, it is convenient for the reactant or reactants added to be added to a mixture of the initiator, and the inhibitor and the catalyst, and any reactant not so added.

A main factor governing such a suitable rate of addition is the relative rates of reaction of the anhydride, the lactone and the epoxide, in particular the one that reacts at the slowest rate. In theory, in particular circumstances, the one that reacts at the slowest rate could be the anhydride or the epoxide or the lactone. We do not know of any combination of circumstances, including variations of reactants used, in which the slowest rate of reaction is not that of the lactone. The reaction of the anhydride is commonly the most rapid, and for that reason we prefer to add the anhydride or a mixture of the anhydride and either or both of the lactone and the epoxide to the initiator, or to the mixture of the initiator with the reagents not so added. It is in general not convenient to add a mixture of the anhydride and the epoxide because of poor solubility of the anhydrides in epoxides, and vice versa. However, a further factor that must be avoided is polymerisation in the mixture of the anhydride and the epoxide before its addition to a mixture of the initiator with the other reagents. It is often convenient, particularly, when the anhydride is a solid at ambient temperature, to add a solution of the anhydride in the lactone to a mixture of the other reagents. A mixture of the anhydride, the epoxide and the lactone could be added to the initiator and any catalyst and any inhibitor used, but polymerisation in the mixture of the anhydride, the epoxide and the lactone may take place before its addition to the initiator. More than one of the anhydride, the lactone and the epoxide can be added in separate streams, being mixed in the reactor in which the reaction is carried out or just before the addition to the reactor. This may be convenient if it is desired to add both the epoxide and the anhydride, with or without the lactone, to a mixture of the initiator and any other reagents. If more than one epoxide is employed it may, if their rates of reaction are substantially different, be convenient to add a mixture of the epoxides in such a manner.

It may be possible, in particular if a polyester having a low molecular weight is to be produced, that a portion of the anhydride or the epoxide or the lactone which is to be added to the initiator, or to the mixture of the initiator with the other reagents, can be present with the initiator or the mixture of the initiator with the other reagents, before the reaction commences. The anhydride or the epoxide or the lactone which is present with the initiator will react with the initiator and any anhydride and epoxide and lactone which is not to be added but is present with the initiator. If the polyester to be manufactured has a low molecular weight or if the portion of the anhydride or the epoxide or the lactone, whichever is to be added, that is present with the initiator is a small proportion of the anhydride or the epoxide or the lactone which is to be added, the initial product of the reaction will comprise the first chain-extending groups of the type of polyester of the present invention.

If this is not so, that is to say if the portion of the anhydride or the epoxide or the lactone which is to be added that is present with the initiator is a large proportion relative to the number of active hydrogen atoms of the initiator, the initial product of the reaction will not comprise the first chain-extending of the type of the polyester of the present invention, but will comprise a block polymer. In either of these two bases or in any intermediate case the initial product is itself an initiator which will react to have chain-extending groups as provided by the process of the present invention.

Desirably less than 3 molecules of the anhydride or the epoxide or the lactone which is to be added are present with the initiator for each active hydrogen atom of the initiator, and advantageously less than 2 molecules. Preferably less than 1 molecule is present and most preferably less than 0.5 molecule, for each active hydrogen atom of the initiator.

Accordingly the invention provides a process for the manufacture of a non-random polyester wherein either (a) the anhydride or the epoxide or the lactone, or
(b) the anhydride or the epoxide or the lactone together with at least a portion of either or both of the others is added to a mixture of the initiator, the etherification inhibitor, if employed, the catalyst, if employed, and either (a) the remaining reactants, or
(b) any remaining reactants not added, respectively, at such a rate of addition that the anhydride, the epoxide and the lactone are consumed at substantially the same rate of consumption. The rate of consumption is expressed as the number of molecules of compound reacted for each residue of the compound in the polyester produced.

If no initiator having an active hydrogen atom is specifically employed, the polymerisation reaction will commonly be initiated by conducting the reaction by the addition of one or more the anhydride, the epoxide and the lactone at a suitable rate to the other reactants, as has been described in the immediately preceding paragraphs, the mixture of the reactants not having an initiator present therein. In such circumstances, the polymerisation reaction will generally commence if the mixture to which the anhydride, the epoxide or the lactone is added is at a sufficiently elevated temperature. A catalyst or an etherification inhibitor, or both will generally be employed, but these are not essential to the performance of the invention without the specific employment of an initiator. If required, the anhydride, the epoxide and the lactone can all be added to a reaction vessel which is at a suitable elevated temperature at such a suitable rate of addition as is hereinbefore described; conveniently in such a case, the reaction vessel contains a high boiling point inert solvent. This description of a process without the specific employment of an initiator having an active hydrogen atom does not imply that we know whether any traces of impurities present act as initiators or not.

The degree of control required on the rate of addition of the anhydride, the epoxide and the lactone will depend on the extent to which the polyester produced is required to be even along its chain length. If, for example, the anhydride is added to a mixture of the initiator, the epoxide and the lactone in such a manner that more anhydride is added than lactone is consumed, as the chain extends an increasing proportion of the chain-extending residues, will be epoxide-anhydride-ester residues. If the anhydride is exhausted before all the lactone has reacted, the polyester will be terminated by a block of lactone residues.

The novel polyesters of the present invention are characterised by having as the main chain-extending groups a plurality of groups of the type

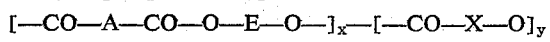

where $x$ and $y$ are each small integers, greater than 0, for example 1, 2, 3 and 4. Usually at least 80% of the chain extending groups will be such groups, and more usually at least 90%. Advantageously at least 95% of the repeating unit are such groups. Usually the chain consists of a

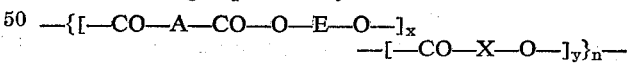

unit wherein $n$ is an integer greater than 1 and $x$ and $y$ are not necessarily the same integer throughout the polyester. The nature of the terminal groups in the chain may vary according to circumstances. In a non-random polyester having a chain-consisting of

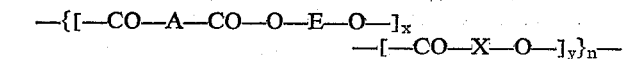

as described above, the mean values of $x$ and $y$, which may be given by $\Sigma x/n$ and $\Sigma y/n$ will be small numbers, greater than 1. The distribution of the values of $x$ and $y$, which must be integers, is, in principle, susceptible to statistical treatment. In practise, the statistical treatment is complicated by unknown factors in the reaction.

It will be understood by those skilled in the art that the process of the present invention and the products produced thereby are susceptible to numerous variations. Different initiators, epoxides, anhydrides, and lactones may be used to give a wide variety of products. The proportions of the anhydride, the epoxide and the lactone may be varied, with appropriate results as to the properties of the polyester composition produced. For example the ratio of epoxide to anhydride may be varied with appropriate variety in the product. Normally a stoichiometric ratio is preferred, but an excess of epoxide may be used if desired. Conveniently the ratio is between 0.9:1 and 2:1, preferably between 0.95:1 and 1.2:1. If the ratio is substantially above 1 and the inhibitor is not very effective in preventing the etherification reactions, a certain amount of such reactions will occur, giving rise to

—O—E—O—E—O— linkages in the polyester.

The ratio of epoxide-anhydride-ester residues to lactose residues can be varied as desired. The effect of varying this ratio on the structural formula of the non-random polyester is found in the ratio of the sum of the values of $x$, $\Sigma x$, to the sum of the values of $y$, $\Sigma y$. If two molecules of lactone are used for each molecule of anhydride and of epoxide the ratio $\Sigma x/\Sigma y$ will be ½. In such a case, when $\Sigma x/\Sigma y$ is substantially different from 1, the mean value of either $x$ or $y$, $\Sigma x/n$ or $\Sigma y/n$ must consequently be greater than the other. If $\Sigma x/\Sigma y=½$, for example, the mean value of $y$ will be twice that of $x$. As the distribution of these values is, in principle, susceptible to statistical treatment, if $\Sigma x/\Sigma y<1$, then values of $y$ higher than 4 for example, 5, 6, 7 and 8, will have a greater probability than if $\Sigma x/\Sigma y=1$. It is to be understood that such non-random polyesters are within the present invention. Desirably the ratios of the moles of lactone employed to moles of whichever is the less of anhydride or epoxide employed is between 9 to 1 and 1 to 9, and preferably between 4 to 1 and 1 to 2. Most preferably the ratio is between 3 to 1 and 1 to 1.

The nature of the terminal groups of the polyester may be governed by the choice of initiator if employed and the relative amounts of epoxide and anhydride present. For example if the initiator is an acid the terminal groups will be acidic unless there is an excess of epoxide present to react with those acidic terminal groups to give terminal hydroxyl groups. This is further illustrated in the table below.

| Initiator | Epoxide/ anhydride ratio | Terminal group |
| --- | --- | --- |
| Acid | ≤1 | —COOH |
| Do | ≥1 | —OH |
| Alcohol or amine | ≤1 | —COOH |
| Do | ≥1 | —OH |

The exact nature of the terminal groups in any particular case can be determined by simple calculation.

The polyesters of the present invention are useful compositions, being liquid or solid according to their constituents and the manner of their preparation. In general, they may be used in place of polyesters formed from alcohols, or their ester-forming derivatives, having a plurality of hydroxy groups, usually two, and carboxylic acids, or their ester-forming derivatives, having a plurality of carboxyl groups, usually two.

For example, polyesters of the present invention which are terminated by hydroxyl groups are particularly valuable for reaction with organic compounds having at least two isocyanate groups to form isocyanate terminated urethane prepolymers. An excess of isocyanate groups over hydroxyl groups should preferably be present in the reaction mixture. A suitable ratio of isocyanate groups to hydroxyl groups is about 2:1, but this can be varied according to the desired properties of the polyurethane product. A preferred process uses a substantially linear polyester terminated by two alcoholic hydroxyl groups and a diisocyanate, the reaction of these compounds forming a substantially linear isocyanate terminated urethane prepolymer.

The isocyanate terminated urethane prepolymer may be reacted with a polyfunctional organic compound containing at least two active hydrogen atoms attached to oxygen or nitrogen or water. Preferably these active hydrogen atoms are part of alcoholic hydroxyl groups, primary amino groups or secondary amino groups. The isocyanate groups react with active hydrogen atoms to form urethane or substituted urea linkage, thereby forming a polyurethane polymer.

The reaction of the isocyanate terminated urethane prepolymer with the polyfunctional compound may take place during the formation of the isocyanate terminated urethane prepolymer, or thereafter. Thus the polyfunctional compound may be added at the start of the reaction between the polyester and the polyisocyanate or thereafter.

The nature and proportions of the compounds used will naturally depend on the desired properties of the polyurethane. A range of polyisocyanates that may be suitable is listed by Siefken (Annalen, 562, pp. 122–135). If desired the polyurethane may, in principle, be modified or treated by any suitable method known to those skilled in the art, for polyurethanes derived, for example, from polyethers. For example it may be cross-linked, or a urethane foam produced by the formation or presence of a gas during the formation of the polyurethane.

Many modifications of the process for the production of the polyurethane and thus the resulting product of the invention will be apparent to one skilled in this art after reviewing the foregoing description. For example, the process may incorporate and thus the product may contain curing agents, foaming agents, such as water, low-boiling liquid, and blowing agents actviated by chemical reaction, and cross-linking agents.

The polyesters of the present invention may be used as plasticisers, for example for polyvinyl chloride.

The polyesters of the present invention may, furthermore, be used in surface coatings, and the invention provides a coating composition containing a film-forming resin and such a polyester. The coating composition may include a solvent or a pigment for example titanium dioxide or both. Suitable film-forming resins include amino-resins formed by reacting formaldehyde with, for example, melamine, urea or benzoguanamaine, and subjecting the product to etherification with an alcohol, for example, butanol. Aromatic solvents for example xylene, are particularly suitable.

The invention is illustrated in the following non-limitative examples.

EXAMPLE 1

Ethanediol (3.1 g.) and 1,2-epoxyoctane (29.3 g.) were heated to 150° C. under a nitrogen atmosphere with stirring. Benzyldimethylamine (0.23 g.) and tetrabutyltitanate (0.544 g.) were added as catalyst. To the mixture was added, slowly over five hours, a solution of phthalic anhydride (19.6 g.) in caprolactone (60.2 g.) which was maintained at 50° C. prior to addition. The mixture was further heated at 150° C. for 30 minutes and was then distilled under reduced pressure to remove excess olefin oxide (13.7 g.). The product, 102 g. of a viscous, tan-coloured liquid, had an acid value of 1.2, a hydroxyl value of 55.7, and a volatile content of 3.6%. The product had a molecular weight of about 1970. The yield of non-volatile polymer was 98.4%.

EXAMPLE 2

A reaction using the same experimental conditions as in Example 1 and using trimethylolpropane (4.45 g.) 1,2-epoxyoctane (33.4 g.), caprolactone (59.6 g.), phthalic anhydride (19.3 g.), benzyldimethylamine (0.20 g.) and tetrabutyl titanate (0.50 g.) yielded a viscous, tan-coloured liquid (103 g.) which had an acid value of 0.5, a hydroxyl value of 54.2 and a volatile content of 3.5%. The product had a molecular weight of about 3080. The yield of involatile polymer was 99.5%.

EXAMPLE 3

A reaction using the same experimental conditions as in Example 1 and using ethanediol (3.12 g.), 1,2-epoxyoctane (26.0 g.), caprolactone (69.0 g.), phthalic anhydride (15.0 g.), benzyldimethylamine (0.21 g.) and tetrabutyl titanate (0.5 g.) yielded a tan-coloured grease which had an acid value of 2.7, and a hydroxyl value of 52.7. The product had a molecular weight of about 2025.

EXAMPLE 4

A reaction using the same experimental conditions as in Example 1 and using ethanediol (3.1 g.), iso-octyl glycidyl ether (45.6 g.), caprolactone (59.9 g.), phthalic anhydride (18.2 g.), benzyldimethylamine (0.22 g.) and tetrabutyl titanate (0.5 g.) yielded a viscous, tan-coloured liquid (103.5 g.) which had an acid value of 1.5, a hydroxyl value of 41.5, and a volatile content of 3.5%. The product had a molecular weight of about 2600. The yield of involatile polymer was 100%.

EXAMPLE 5

This example is a comparative example not in accordance with the present invention. The product had a higher melting point than similar, liquid, non-random polyesters. A reaction vessel was charged with ethanediol (1.26 g.), 1,2-epoxyoctane (13.6 g.), caprolactone (25.7 g.), phthalic anhydride (7.8 g.), benzyldimethylamine (0.09 g.) and tetrabutyl titanate (0.2 g.). The mixture was heated, with stirring, at 150° C. for five hours and was then distilled under reduced pressure to remove excess olefin oxide (6 g.). The product (40.5 g.) was a tan coloured grease with an acid value of 0.4 and a hydroxyl value of 55.0. The product had a molecular weight of about 2025. The yield of polymer was 97.4%.

EXAMPLE 6

A thermosetting polyurethane rubber was cast by heating the polymer (12.36 g.) obtained in Example 1 with a commercially available sample of toluene di-isocyanate (2.3 g.) which contained 80% w./w. of the 2,4-isomer and 20% w./w. of the 2,6-isomer. After 90 minutes at 100° C. a viscous liquid prepolymer was obtained and was reacted at 100° C. with molten di-(4-amino-3-chlorophenyl)-methane (M.O.C.A.) (1.62 g.), degassed, cast into a sheet and cured at 120° C. for 15 hours. The polymer was non-crystalline and had a gel time of approximately 5 minutes.

EXAMPLE 7

A thermosetting polyurethane rubber was prepared in a similar manner to that in Example 6 using the polymer from Example 3 (12.76 g.), toluene di-isocyanate 2.36 g.) (80%/20%), di-(4-amino-3-chlorophenyl)-methane (1.70 g.). The rubber was non-crystalline, and had a gel time of approximately 5 minutes, and a cold flex temperature of —30° C. (Clash and Berg determination B.S. 2782 Part 1, method 104B).

EXAMPLE 8

The polymer (7 g.) synthesised in Example 1 was compounded with paste grade polyvinyl chloride (7 g.) and dibutyl tin dilaurate (0.4 g.). The mixture was heated to 170° C. under 20 tons per square inch pressure and yielded a plasticised polyvinyl chloride sheet which did not exude plasticiser. The sheet had a cold flex temperature of —21.6° C.

EXAMPLE 9

A prepolymer was prepared by reacting the polymer (9.6 g.) obtained in Example 1 with redistilled di-(4-isocyanatophenyl)-methane (M.D.I.) (2.38 g.) at 85° C. for two hours. The product dissolved in 50 ml. dimethylformamide, was mixed with ethylene diamine (0.26 g.) dissolved in 10 ml. dimethylformamide and phosphoric acid (0.024 g.). The solution was spread as thin fibres (films), evaporated and cured at 100° C. for 16 hours.

Tough, transparent films were obtained which were non-crystalline and softened slightly on heating to 180° C.

EXAMPLE 10

A polyurethane film was cast in the same manner as in Example 9 using the polymer (7.5 g.) from Example 3, M.D.I. (1.81 g.), ethylene diamine (0.197 g.) and phosphoric acid (0.031 g.).

The films were similar in nature to those obtained in Example 9.

EXAMPLE 11

The polymeric triol (10.02 g.) obtained in Example 2 was mixed with dibutyl tin dilaurate (0.03 g.), triethylamine (0.015 g.), water (0.24 g.) and a commercially available silicone oil foaming agent (0.13 g.). The components were thoroughly mixed and toluene di-isocyanate (3.24 g.) (80%/20% isomer ratio) was added and the mixture quickly stirred. The material foamed and gelled after 5 minutes. It was cured at 150° C. for 2 hours to yield an off-white flexible polyurethane foam.

EXAMPLE 12

The polymer (11.7 g.) obtained in Example 1 was mixed with 0.1 ml. cobalt octoate (6% w./w. solution in acetone, as cobalt metal) and heated to 135° C. for 30 minutes. Naphthalene-1,5-diisocyanate (2.05 g.) was added as a powdered solid and heating was continued for a further 5 minutes at 135° C. Butane-1,4-diol (0.23 g.) was then thoroughly mixed with the sample and the mixture, after being placed under reduced pressure for 2 minutes, was cured at 120° C. for 12 hours. A non-crystalline polyurethane rubber resulted.

EXAMPLE 13

The polymer (10 g.), from Example 2, was mixed with titanium dioxide (8.8 g.) and xylene (3.5 g.). The mixture was ball milled for 20 hours. B.E. 645 (butylated melamine-formaldehyde resin) (4.5 g.), butanol (0.5 g.) and p-toluene sulphonic acid (0.5 g.) (20% w./w. solution in iso-propanol) was then mixed with the sample and milling was continued for a further 3 hours. The mixture was then successfully stoved at 150° C. for 30 minutes to yield a soft paint film.

EXAMPLE 14

Ethanediol (3.2 g.) and butyl glycidyl ether (40.2 g.) were heated to 140° C. under a nitrogen atmosphere with stirring. Benzyldimethylamine (0.2 g.) and tetrabutyl titanate (0.5 g.) were added as catalyst. To the mixture was added slowly over 5 hours succinic anhydride (14.2 g.) in caprolactone (64.6 g.) which was maintained at 50° C. prior to addition. The mixture was further heated to 150° C. for 30 minutes and was then distilled under reduced pressure to remove excess olefin oxide (12 g.). The product (108 g.), a viscous, tan-coloured liquid, had an acid value of 1.7, a hydroxyl value of 32.6 and a volatile content of 3.5%. The product had a molecular weight of about 2060. The yield of involatile polymer was 100%.

EXAMPLE 15

A reaction using the same experimental conditions as in Example 14 and using ethanediol (3.12 g.), butyl glycidyl ether (34.8 g.), caprolactone (60.2 g.), phthalic anhydride (19.5 g.), benzyldimethylamine (0.2 g.), and tetrabutyl titanate (0.6 g.), yielded a tan-coulored, semi-solid product (104 g.) which had an acid value of 1.6, a hydroxyl value of 55.7 and a volatile content of 3.8%. The product had a molecular weight of about 1960. The yield of involatile polymer was 99%.

EXAMPLE 16

A reaction using the same experimental conditions as in Example 14 and using ethanediol (3.12 g.), 1,2-epoxyoctane (29.4 g.), caprolactone (60.2 g.), phthalic anhydride (20.6 g.), dibutyl tin dilaurate (0.5 g.), and benzyldimethylamine (0.2 g.), yielded a tan-coloured grease (102 g.) which had an acid value of 4.0, a hydroxyl value of 52.6 and a volatile content of 4.6%. The product had a molecular weight of about 1980. The yield of involatile polymer was 97%.

EXAMPLE 17

A reaction using the same experimental conditions as in Example 14 and using ethanediol (3.1 g.), 1,2-epoxyoctane (36.9 g.), caprolactone (64 g.), succinic anhydride (14.2 g.), benzyldimethylamine (0.2 g.), tetrabutyl titanate (0.5 g.), yielded a tan-coloured liquid (100 g.) which had an acid value of 0.9, a hydroxyl value of 58.5 and a volatile content of 3.4%. The product had a molecular weight of about 1890. The yield of involatile polymer was 96.6%.

EXAMPLE 18

The polymer (7 g.) synthesised in Example 17 was compounded with paste-grade polyvinyl chloride (7 g.) and dibutyl tin dilaurate (0.4 g.). The mixture was heated to 170° C. under 20 tons per square inch pressure and yielded a plasticised polyvinyl chloride sheet which did not exude plasticiser. The polymer was also milled with a suspension-grade polyvinyl chloride polymer (Corvic Bo5/60), and the milled mixture was similarly pressed. The product had a 100% modulus value of 1,314 lbs. per square inch and a cold flex temperature of −15.5° C. (Clash and Berg).

EXAMPLE 19

The polymer from Example 15 was compounded with paste-grade polyvinyl chloride in a manner similar to that used in Example 17 and a plasticised polyvinyl chloride sheet was obtained which did not exude plasticiser.

EXAMPLE 20

The polymer from Example 16 was compounded with paste-grade polyvinyl chloride in a manner similar to that used in Example 17 and yielded a plasticised polyvinyl chloride sheet which did not exude plasticiser.

EXAMPLE 21

The polymer obtained in Example 4 was milled with suspension-grade polyvinyl chloride (Corvic D65/60) was pressed into a sheet, as in Example 17, and was found to have a 100% modulus value of 1,548 lbs. per square inch and a cold flex temperature of −2.54° C.

EXAMPLE 22

A thermosetting polyurethane rubber was cast by heating the polymer (13.34 g.) obtained in Example 17 with a commercially available sample of toluene di-isocyanate (2.56 g.), which contained 80% w./w. of the 2,4-isomer and 20% w./w. of the 2,6-isomer. After 90 minutes at 100° a viscous pre-polymer was obtained and this was reacted at 100° with molten M.O.C.A. (1.74 g.) degassed, cast into a sheet and cured at 120° C. for 15 hours. The rubber obtained was non-crystalline.

EXAMPLE 23

A thermosetting polyurethane rubber was prepared in a similar manner to that in Example 22 using the polymer from Example 16 (12.9 g.), toluene di-isocyanate (2.2 g.) and M.O.C.A. (1.7 g.). The rubber was non-crystalline.

EXAMPLE 24

A pre-polymer was prepared by reacting the polymer (10.2 g.) obtained in Example 17 with redistilled M.D.I. (2.6 g.) at 85° C. for 2 hours. The product, dissolved in 50 ml. dimethylformamide, was mixed with ethylene diamine (0.24 g.), dissolved in 10 ml. dimethylformamide and phosphoric acid (0.02 g.). The solution was spread as a thin film, evaporated and cured at 100° for 16 hours. A tough transparent film was obtained which was non-crystalline.

EXAMPLE 25

The polymer (9.72 g.) from Example 17 was mixed with butane-1,4-diol (0.87 g.) at 100° C., M.D.I. (4.06 g.) was dissolved in the mixture at 150° C. The mixture quickly gelled and became opaque. The product was pressed into a thin sheet at 175° C. (20 lbs. per square inch pressure), the sheet was cooled to room temperature, the pressure released and the sheet then cured for a further 24 hours at 80°, to yield a thermoplastic polyurethane rubber.

EXAMPLE 26

The polymer from Example 1 (10.05 g.), butane-1,4-diol (0.9 g.) and M.D.I. (4.18 g.) were reacted as in Example 25 to yield a similar thermoplastic polyurethane rubber.

EXAMPLE 27

2-ethylhexanol (3.7 g.) and 1,2-epoxyoctane (34.8 g.) were heated to 140° C. under a nitrogen atmosphere with stirring. Benzyldimethylamine (0.2 g.) and tetrabutyl titanate (0.5 g.) were added as catalyst. To the mixture was added slowly over 5 hours a solution of phthalic anhydride (20.5 g.) in caprolactone (50.0 g.) which was maintained at 50° C. prior to addition. The mixture was further heated at 150° C. for 30 minutes and was then distilled under reduced pressure to remove excess olefin oxide. The product (93 g.), a viscous tan-coloured liquid, had an acid value of 1.1, a hydroxyl value of 28.3, a volatile content of 1.9% and a viscosity of approximately 11,940 centipoises at 25° C. The product had a molecular weight of about 1910. The yield of involatile polymer was 98.7%.

EXAMPLE 28

1,2-epoxyoctane (34.7 g.), N-ethylpiperidine (0.06 g.) and tetrabutyl titanate (0.5 g.) were heated to 140° C. under an atmosphere of nitrogen. Phthalic anhydride (20.0 g.) dissolved in caprolactone (61.0 g.) and maintained at 50° C. was then added slowly over 24 hours. The mixture was further heated at 140° C. for 30 minutes and was then distilled under reduced pressure to remove excess olefin oxide. The product (101 g.) was a very viscous, tan-coloured liquid with an acid value of 1.6, a viscosity of 1,796 poises at 25° C. and a volatile content of 4.5%. No initiator was added in this example, but ordinary grades of materials were used. Such grades may contain trace quantities of compounds, for example water, that can act as initiators or that may hydrolyse another compound to act as an initiator. We do not know whether polymerisation can take place in these general circumstances in the total absence of an initiator. The molecular weight of the polyester was probably between 8000 and 10,000. The yield of involatile polymer was 97.5%.

EXAMPLE 29

The polymer from Example 27 was compounded with paste-grade polyvinyl chloride in a manner similar to that of Example 18 and yielded a plasticiser polyvinyl chloride sheet which did not exude plasticiser.

EXAMPLE 30

The polymer from Example 28 was compounded with paste-grade polyvinyl chloride in a manner similar to that of Example 18 and yielded a plasticised polyvinyl chloride sheet which did not exude plasticiser.

EXAMPLE 31

Butane-1,4-diol (102.5 g.) tetrabutyl titanate (2.3 g.) and N-methyl morpholine (1.15 g.) were heated to 150° C. A solution containing caprolactone (1476 g.), succinic anhydride (438 g.) and propylene oxide (348 g.) was added dropwise, with stirring, to the initial solution over 11 hours. The heated reaction mixtures were maintained under nitrogen atmosphere throughout. After further heating at 150° for ½ hour, excess propylene oxide was removed under reduced pressure to yield a clear, viscous, pale yellow liquid which had an acid value of 1.5, a hydroxyl value of 51.9 and a viscosity, at 26°, of 10,000 centipoises. The product had a molecular weight of about 2100.

EXAMPLE 32

Butane-1,4-diol (4.54 g.), dibutyl tin dilaurate (0.51 g.) and N-methyl morpholine (0.2 g.) were heated to 170°. A solution of caprolactone (65.7 g.), succinic anhydride (20.4 g.) and propylene oxide (36 g.) was added to the mixture as in Example 31. The product was a clear, pale yellow, viscous liquid with an acid value of 0.7 and a hydroxyl value of 56.3. The product had a molecular weight of about 1965.

EXAMPLE 33

Butane-1,4-diol (67.5 g.), tetrabutyl titanate (3.1 g.) and N-methyl morpholine (1.5 g.) were heated to 160°. A solution containing caprolactone (975 g.), phthalic anhydride (328.6 g.) and propylene oxide (206 g.) was added to the mixture as in Example 31. The product was a clear, brown, viscous liquid with an acid value of 0.44, hydroxyl value of 56.9 and a viscosity, at 25°, of 18,500 centipoises. The product had a molecular weight of about 1955.

EXAMPLE 34

2,2-dimethylpropane-1,3-diol (5.27 g.), tetrabutyl titanate (0.13 g.) and N-methyl morpholine (0.10 g.) were heated to 140°. A solution containing caprolactone (68.02 g.), succinic anhydride (17 g.) and propylene oxide (44 g.) was added to the mixture as in Example 31. The temperature of the mixture was then lowered to 100° and excess propylene oxide was removed under vacuum. The product was a clear, pale yellow, viscous liquid which had an acid value of 1.3 and a hydroxyl value of 52.5. The product had a molecular weight of about 2085.

EXAMPLE 35

The polyester from Example 31 (30.2 g.) was mixed with di(4 - isocyanatophenyl)-methane (19.4 g.) and butane-1,4-diol (5.1 g.). The mixture, after it had become homogeneous, was heated to 175° under pressure for 15 minutes. A polyurethane rubber sheet was moulded which, after curing for 12 hours at 100°, had the following properties:

100% modulus: 127 kg. cm.$^{-2}$
300% modulus: 205 kg. cm.$^{-2}$
Tensile strength: 613 kg. cm.$^{-2}$
Elongation (at break): 600%
Cold flex (Clash and Berg): −25°
Shore hardness (A): 92

EXAMPLE 36

The polyester from Example 33 (27.8 g.) was mixed with di(4 - isocyanatophenyl)-methane (17.5 g.) and butane-1,4-diol (4.6 g.). The mixture, after it had become homogeneous, was heated to 150°, under pressure, for 15 minutes. A polyurethane rubber sheet was moulded which, after curing for 12 hours at 100°, had the following properties:

100% modulus: 130 kg. cm.$^{-2}$
300% modulus: 230 kg. cm.$^{-2}$
Tensile strength: 515 kg. cm.$^{-2}$
Elongation at break: 500%
Cold flex (Clash and Berg): −17°
Hardness (Shore A): 92

EXAMPLE 37

2-ethylhexanol (6.5 g.), tetrabutyl titanate (0.2 g.) and N-methyl morpholine (0.1 g.) were heated to 150° under nitrogen atmosphere with stirring. A solution containing succinic anhydride (19.2 g.), caprolactone (65.8 g.) and ethylene oxide (42.5 g.) was added dropwise to the mixture over 10 hours. The mixture was further heated at 150° for 1 hour and the excess ethylene oxide was then removed at 100° under reduced pressure. The product was a clear viscous pale brown liquid with an acid value of 1.0 and a hydroxyl value of 26.1. The product had a molecular weight of about 2070.

EXAMPLE 38

Butane-1,4-diol (4.5 g.), tetrabutyl titanate (0.1 g.), N-methyl morpholine (0.1 g.) and caprolactone (65 g.) are heated to 140° under nitrogen atmosphere. Succinic anhydride (20 g.) and propylene oxide (30 g.) dissolved in 50 ml. of dimethylformamide is then added dropwise over 12 hours to the continuously stirred solution. The solvent is then removed under reduced pressure to yield a viscous liquid polymer. The product had a molecular weight of about 2000.

EXAMPLE 39

2-ethylhexanol (6.5 g.), tetrabutyl titanate (0.51 g.) and N-methyl morpholine (0.2 g.) were heated to 140°. A solution containing caprolactone (69.7 g.), maleic anhydride (15.0 g.) and propylene oxide (30 g.) was added dropwise to the mixture over 10 hours, the mixture being continuously stirred under nitrogen. After further heating for ½ hour the excess propylene oxide was then removed under reduced pressure to yield a clear, viscous, brown liquid polymer with an acid value of 1.81 and a hydroxyl value of 18.02. The product had a molecular weight of about 2820. The polyester was found to be compatible as a plasticiser for polyvinyl chloride.

EXAMPLE 40

This is a comparative example not in accordance with the present invention. The polyester produced was a solid, in contrast to the liquid polyesters produced by directly analogous processes of the present invention. Ethane diol (3.22 g.), tetrabutyl titanate (0.52 g.) and benzyl dimethylamine (0.22 g.) were heated to 140°. A solution containing caprolactone (60.2 g.), phthalic anhydride (19.7 g.), and 1,2-epoxy octane (29.4 g.) was prepared and divided into three equal portions; one was added immediately and the other two at 20 minute intervals. The product was an opaque waxy solid.

EXAMPLE 41

This is a comparative example not in accordance with the present invention. The polyester produced was a solid, in contrast to the liquid polyesters produced by directly analogous processes of the present invention. Ethane diol (1.26 g.), caprolactone (25.7 g.), 1,2-epoxy octane (13.6 g.), phthalic anhydride (7.8 g.) benzyl dimethylamine (0.09 g.) and tetrabutyl titanate (0.2 g.) were heated at 140° for 2 hours. The excess of 1,2-epoxyoctane was removed by distillation to yield an opaque, waxy, tan coloured polymer with acid value 0.4 and a hydroxyl value of 55.4.

EXAMPLE 42

Bis-chloromethyl oxetane (30 g.) was mixed with ethane diol (3.1 g.), benzyldimethylamine (0.1 g.) and tetrabutyl titanate (0.2 g.). A solution of phthalic anhydride (15.1 g.) in caprolactone (66 g.) was then added dropwise over 10 hours to the stirred mixture. After removal of excess oxetane under reduced pressure a clear brown viscous liquid was obtained which had an acid value of 1.4. The polymer had a molecular weight of about 2000.

EXAMPLE 43

Ethane diol (3.1 g.), 1,2-epoxy octane (21.4 g.) and 1,2-epoxy butane (12.0 g.) are heated to 110° C. under nitrogen. Benzyl dimethylamine (0.23 g.) and tetrabutyl titanate (0.54 g.) are added as catalyst. To the mixture is added over 10 hours a solution of phthalic anhydride (19.6 g.) in caprolactone (60.2 g.) which is maintained at 50° prior to addition. The mixture is further heated at 180° for 30 minutes and the excess olefin oxides are then distilled under reduced pressure to yield a clear viscous polymer of molecular weight about 2000.

EXAMPLE 44

2,2-dimethylpropane-1,3-diol (5 g.), tetrabutyl titanate (0.1 g.) and N-methyl morpholine (0.1 g.) are heated to 140°. A solution containing isomeric methylcaprolactones (68 g.) succinic anhydride (17 g.) and propylene oxide (44 g.) is added to the mixture as in Example 31. The temperature of the mixture is then lowered to 100° and excess propylene oxide removed under vacuum. The product is a clear mobile liquid of molecular weight about 2000.

EXAMPLE 45

Example 44 was repeated using a mixture of caprolactone (40 g.) and isomeric methylcaprolactones (28 g.) in place of the methyl caprolactone. The product is a mobile liquid of molecular weight about 2000.

EXAMPLE 46

2,2-dimethylpropane-1,3-diol (5.2 g.), tetrabutyl titanate (0.1 g.) and N-methyl morpholine (0.1 g.) are heated to 140°. A solution containing caprolactone (68 g.) succinic anhydride (6.9 g.), phthalic anhydride (10.2 g.) and propylene oxide (44 g.) are added to the mixture as in Example 31. The temperature of the mixture is then lowered to 100° and excess propylene oxide is removed under vacuum.. The product is a clear viscous liquid of molecular weight about 2000.

EXAMPLE 47

Iso-octanol (6.5 g.) tetrabutyl titanate (0.1 g.) and potassium carbonate (0.1 g.) were heated to 160°. A solution of succinic anhydride (15.2 g.) in caprolactone (69.5 g.) and propylene oxide (35.2 g.) was added to the mixture as in Example 31. The product was an opaque, waxy tan coloured polymer of acid value 0.92 and molecular weight of about 2000.

EXAMPLE 48

1,2-epoxyoctane (31.5 g.), di(4-aminophenyl)methane (9.7 g.), benzyldimethylamine (0.2 g.), and tetrabutyl titanate (0.5 g.) were heated to 140°. A solution of phthalic anhydride (18.3 g.) in caprolactone (56.1 g.) was reacted with the mixture as in Example 1. The product was a dark brown viscous liquid with an acid value of 3.0 and a molecular weight of about 2000.

EXAMPLE 49

1,2-epoxyoctane (34.3 g.), quinol (5.5 g.), benzyldimethylamine (0.2 g.) and tetrabutyl titanate (0.5 g.) were heated to 140°. A solution of phthalic anhydride (19.1 g.) in caprolactone (58.9 g.) was reacted with the mixture as in Example 1. The product was a dark brown viscous liquid with a hydroxyl value of 52.5, acid value of 4.2 and molecular weight of 1980.

EXAMPLE 50

Adipic acid (7.3 g.), tetrabutyl titanate (0.2 g.) and N-methyl morpholine (0.2 g.) are heated to 140°. A solution of succinic anhydride (17.5 g.) in caprolactone (65 g.) and propylene oxide (30 g.) is added dropwise to the mixture over 12 hours. The excess propylene oxide is then removed under reduced pressure to yield a clear viscous liquid of molecular weight about 2000.

EXAMPLE 51

Butane-1,4-diol (4.5 g.), stannous octoate (0.5 g.) and N-methyl morpholine (0.2 g.) are heated to 170°. A solution of caprolactone (65.7 g.), succinic anhydride (20.4 g.) and propylene oxide (36 g.) are added to the mixture as in Example 31. The product is a clear viscous liquid of molecular weight about 2000.

EXAMPLE 52

Butane-1,4-diol (4.5 g.), tetrabutyl titanate (0.2 g.), N-methyl morpholine (0.2 g.) and a glycidyl ester (21.9 g.) of the structure:

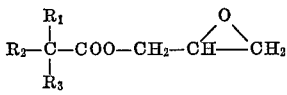

marketed by Shell Chemicals Limited and known commercially as Cardura E, are heated to 140°. A solution of caprolactone (65.7 g.) and succinic anhydride (20.4 g.) are added slowly to the mixture over 10 hours. The product is a viscous liquid of molecular weight about 2000.

EXAMPLE 53

Iso-octanol (6.5 g.), tetrabutyl titanate (0.1 g.) and sodium acetate (0.1 g.) are heated to 160°. A solution of succinic anhydride (15.2 g.) in caprolactone (69.5 g.) and propylene oxide (35.2 g.) is added to the mixture as in Example 31. The product is an opaque viscous liquid of molecular weight about 2000.

What we claim is:

1. A process for the production of a polyester comprising reacting together as reactants
   at least one anhydride,
   at least one epoxide, and
   at least one lactone
in a reaction mixture including
   an initiator, and
   an etherification inhibitor;
wherein
   said anhydride is the anhydride of a dicarboxylic acid;
   said epoxide is a monoheterocyclic oxirane or a monoheterocyclic oxetane or a mixture thereof, said oxirane or oxetane being unsubstituted or substituted with a member selected from the group consisting of alkyl, aryl, and alkyl or aryl substituted with a member selected from the group consisting of chloro, alkoxy, aryloxy, alkoxy carbonyl, aryl carbonyl, alkyl carbonyloxy, and aryloxy carbonyloxy;
   said lactone has a graphic formula

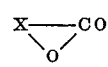

in which X is a —$(CH_2)_n$— group wherein $n$ is an integer from 4 to 7 or wherein X is a —$(CR_2)_n$— group wherein $n$ is an integer from 4 to 7 and wherein each of the 8 to 14 groups R is any group selected from methyl, ethyl, n-propyl and isopropyl groups and hydrogen, chlorine and bromine atoms, provided that the total number of carbon atoms in the —$(CR_2)_n$— group does not exceed 12 and provided that there are no more than 2 halogen atoms in the —$(CR_2)_n$— group;
   said initiator has at least one active hydrogen atom attached to an oxygen or nitrogen or sulphur atom; and
   said inhibitor is selected from the group consisting of tertiary amines, salts of carboxylic acids, carbonates, hydroxides or oxides of alkali metals and carbonates, hydroxides or oxides of alkaline earth metals,
and wherein
   the reactants are added to the reaction mixture at such a rate that the rates of comsumption of each individual reactant (divided by the total number of residues of that reactant in the product) are substantially the same.

2. A process as claimed in claim 1 wherein the lactone polymerization catalyst is an organic titanate.

3. A process as claimed in claim 1 wherein the lactone polymerization catalyst is a tin or lead or manganese salt of a carboxylic acid.

4. A process as claimed in claim 1 wherein the anhydride is added to a mixture of the initiator, and the etherification inhibitor, and the catalyst, and the epoxide and the lactone.

5. A process as claimed in claim 4 wherein the whole of the anhydride is so added.

6. A process as claimed in claim 4 wherein a portion of the epoxide or a portion of the lactone or both are added to the mixture during the addition of the anhydride.

7. A process as claimed in claim 6 wherein the anhydride is dissolved in the lactone to form a solution which is added to the mixture.

8. A process as claimed in claim 1 wherein a portion or all of the epoxide or the lactone are added to a mixture of the initiator, and the etherification inhibitor and the catalyst, and any remaining epoxide or lactone and the anhydride.

9. A process for production of a polyester comprising the reaction together of at least one dicarboxylic acid anhydride, at least one epoxide comprising a monoheterocyclic oxirane or a monoheterocyclic oxetane or a mixture thereof and at least one lactone having a graphic formula

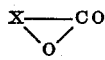

wherein X is a —$(CH_2)_n$— group wherein $n$ is an integer from 4 to 7 or wherein X is a —$(CR_2)_n$— group wherein $n$ is an integer from 4 to 7 and wherein each of the 8 to 14 groups R is any group selected from methyl, ethyl, n-propyl and isopropyl groups and hydrogen, chlorine and bromine atoms, provided that the total number of carbon atoms in the —$(CR_2)_n$— group does not exceed 12 and provided that there are no more than 2 halogen atoms in the —$(CR_2)_n$— group, said oxirane and oxetane being unsubstituted or substituted with a member selected from the group consisting of alkyl, aryl, and alkyl or aryl substituted with a member selected from the group consisting of chloro, alkoxy, aryloxy, alkoxy carbonyl, aryloxy carbonyl, allkyl carbonyloxy, and aryl carbonyloxy, in the presence of a lactone polymerization catalyst and an etherification inhibitor which is selected from the group consisting of tertiary amines, alkali or alkaline earth carbonates, hydroxides, oxides or salts of carboxylic acids, wherein the rates of consumption of the said epoxide, the said anhydride and the said lactone are the same throughout the reaction.

10. A process as claimed in claim 9 wherein the lactone polymerization catalyst is an organotin compound or an organotitanium compound or an organic titanate.

11. A process as claimed in claim 9 wherein the lactone polymerization catalyst is a tin or lead or manganese salt of a carboxylic acid.

12. A process as claimed in claim 9 where the anhydride is added to a mixture of the etherification inhibitor and the catalyst, and the epoxide and the lactone.

13. A process as claimed in claim 12 wherein the whole of the anhydride is so added.

14. A process as claime in claim 12 wherein a portion of the epoxide or a portion of the lactone or both are added to the mixture during the addition of the anhydride.

References Cited

UNITED STATES PATENTS

| | | | |
|---|---|---|---|
| 2,962,524 | 11/1960 | Hostettler et al. | 260—484 |
| 3,169,945 | 2/1965 | Hostettler et al. | 260—78.3 |
| 3,294,743 | 12/1966 | Mack | 260—47 |
| 3,408,421 | 10/1968 | Kurka | 260—830 |

OTHER REFERENCES

Chem. Abstracts 67, 91619f (1967).
Chem. Abstracts 63, 13442f (1965).

WILLIAM H. SHORT, Primary Examiner

E. A. NEILSEN, Assistant Examiner

U.S. Cl. X.R.

260—78.3, 484 A